(12) United States Patent
van Deventer et al.

(10) Patent No.: US 7,748,163 B2
(45) Date of Patent: Jul. 6, 2010

(54) METHOD FOR TREATING SEEDS, AND SEEDS OBTAINABLE WITH THE METHOD

(75) Inventors: Hendricus Cornelis van Deventer, Apeldoorn (NL); Albert van Duijn, Oegstgeest (NL); Rudy Mathias Henricus Heijmans, Westervoort (NL)

(73) Assignee: Nederlandse Organisatie Voor Toegepast-Natuurwetenschappelijk Onderzoek Tno, Delft (NL)

( * ) Notice: Subject to any disclaimer, the term of this patent is extended or adjusted under 35 U.S.C. 154(b) by 583 days.

(21) Appl. No.: 10/543,768

(22) PCT Filed: Jan. 29, 2004

(86) PCT No.: PCT/NL2004/000066

§ 371 (c)(1),
(2), (4) Date: Aug. 25, 2005

(87) PCT Pub. No.: WO2004/066710

PCT Pub. Date: Aug. 12, 2004

(65) Prior Publication Data

US 2006/0150493 A1    Jul. 13, 2006

(30) Foreign Application Priority Data

Jan. 31, 2003    (NL) .................................... 1022549

(51) Int. Cl.
    *A01G 7/00*    (2006.01)
(52) U.S. Cl. ................................................ 47/58.1 SE
(58) Field of Classification Search .................. 47/57.6, 47/58.1 R, 58.1 SE, DIG. 9
See application file for complete search history.

(56) References Cited

U.S. PATENT DOCUMENTS

| 4,911,889 A | * | 3/1990 | Leland et al. ................. 422/26 |
| 5,615,518 A | | 4/1997 | Suzuki |

FOREIGN PATENT DOCUMENTS

| EP | 0 556 101 A | 8/1993 |
| EP | 0 556 101 A1 | 8/1993 |
| EP | 1 025 761 A | 8/2000 |
| EP | 1 025 761 A2 | 8/2000 |
| GB | 2 221 830 A | 2/1990 |

OTHER PUBLICATIONS

International Search Report of PCT/NL2004/000066, mailed May 7, 2004.

* cited by examiner

*Primary Examiner*—Son T. Nguyen
(74) *Attorney, Agent, or Firm*—Nixon & Vanderhye P.C.

(57) ABSTRACT

The invention relates to a method for treating seeds, comprising the following steps: (a) a sterilization step wherein, for 0.1 to 60 seconds and at a minimum pressure of 0.5 bar absolute, the seeds are contacted with a condensing medium having a condensation temperature of 80-200 DEG C, wherein the medium condenses on the seeds and the temperature of the surface of the seeds is raised to 200 DEG C at most; and (b) a cooling step wherein the sterilized seeds obtained in step (a) are cooled, wherein the temperature of the surface of the seeds is lowered, within 30 seconds at most, to 50 DEG C at most, and wherein the conditions of steps (a) and (b) are set such that the germination capacity of the seeds is relatively preserved or increases. The invention further relates to seeds obtainable with the method according to the invention.

10 Claims, 2 Drawing Sheets

METHOD FOR TREATING SEEDS, AND SEEDS OBTAINABLE WITH THE METHOD

Figure 1:
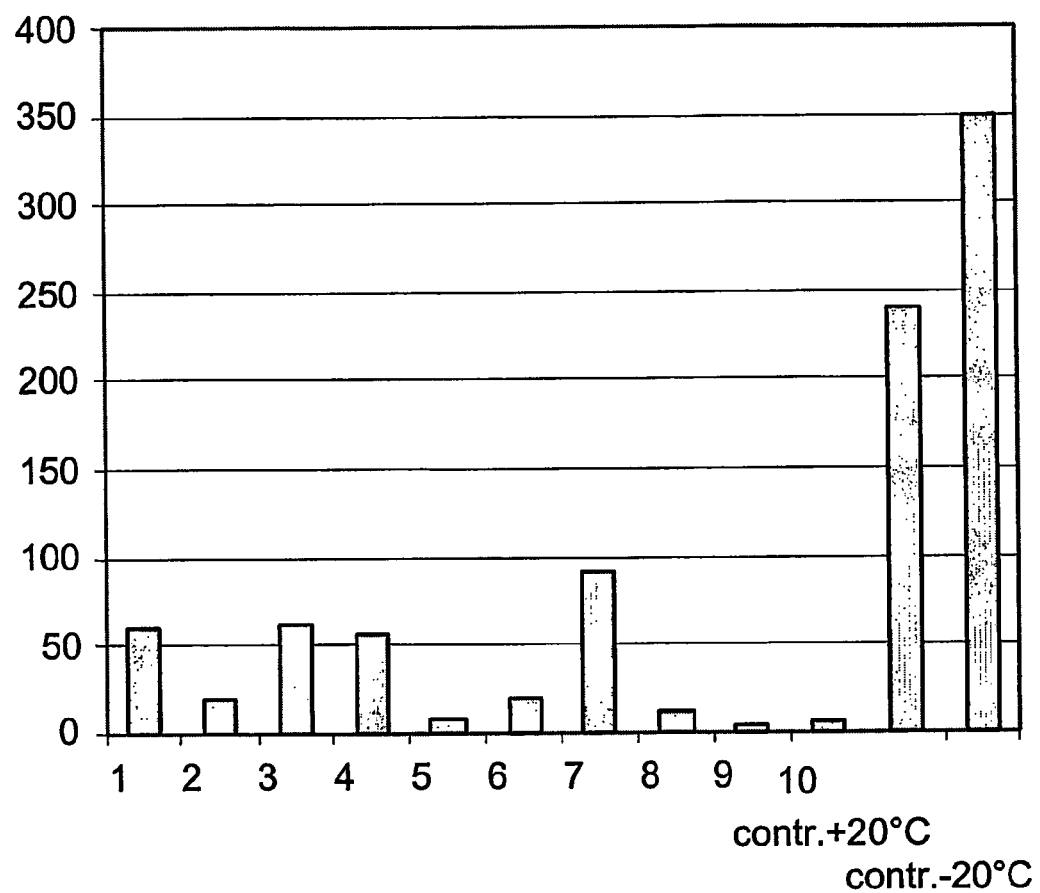

This application is the US national phase of international application PCT/NL2004/000066, filed 29 Jan. 2004, which designated the U.S. and claims priority of NL 1022549, filed 31 Jan. 2003, the entire contents of each of which are hereby incorporated by reference.

The invention relates to a method for treating seeds, and seeds obtainable with the method.

In general, seeds are subjected to a sterilization treatment in order to kill the pathogens present on the seeds so that the transmission of pathogens to the crop to grow from the seeds is avoided and harm to the seeds themselves is prevented. Such a treatment also increases the storage life of seeds. This applies to both seeds for sowing and seeds which are, possibly after germination, suitable for consumption or industrial processing. For seeds intended for reproduction or for consumption or industrial processing after the start of the germination process, it is logically of vital importance that the germination capacity, or the enzyme activity, is preserved.

Seeds suitable for direct consumption are usually treated under such conditions that all germination capacity, if present at all, is completely lost. In this context, reference can be made to, for instance, international patent application WO 96/20606, in which seeds, herbs and spices are sterilized by means of a heat treatment which may, for instance, be carried out with steam. While the taste and smell of the seeds which are subjected to such a treatment are well preserved, the germination capacity of seeds which are subjected to such a treatment is completely lost.

Seeds whose germination capacity needs to be preserved, by contrast, are nowadays treated with chemicals by means of which the number of pathogens on the surface of the seeds is reduced, while the germination capacity can indeed be preserved. However, particularly for biological cultivation, and for seeds which are consumed or processed when germinated, the use of such chemicals is highly undesired, while the norms regarding chemical additions for traditional seed production are becoming increasingly stringent.

The object of the present invention is therefore to provide a method for treating seeds, in which the seeds are sterilized without chemicals needing to be used, and in which at least a considerable extent of the germination capacity of the seeds is preserved or even increases.

It has now surprisingly been found that this can be achieved by a combination of a specific sterilization step and a specific cooling step.

The invention thus relates to a method for treating seeds, comprising the following steps:

(a) a sterilization step in which, for 0.1 to 60 seconds and at a minimum pressure of 0.5 bar absolute, the seeds are contacted with a medium having a condensation temperature of 80-200° C., wherein the medium condenses on the seeds and the temperature of the surface of the seeds is raised to 200° C. at most; and (b) a cooling step in which the sterilized seeds obtained in step (a) are cooled, wherein the temperature of the surface of the seeds is lowered, within 30 seconds at most, to 50° C. at most, and the conditions of steps (a) and (b) are set such that the germination capacity of the seeds is relatively preserved or increases.

The seeds obtained with the method according to the invention exhibit a long storage life, while the germination capacity is at least to a considerable extent preserved or even increases. Very surprisingly, it has been observed that the seeds treated with the method according to the invention often have a better germination capacity than untreated seeds.

In the context of the present invention a "relative preservation of germination capacity" is understood to mean that the germination capacity as such is usually preserved, but that, in certain cases, the germination capacity can decrease by 25% at most, that is, a minimum preservation of 75% of the germination capacity such as it is present before the treatment.

In the use of the present invention, the condensing medium condenses on the surface of cold seed in step (a), the surface being very rapidly and uniformly heated, after which, before the heat can penetrate the seed, in step (b), the formed condensate rapidly evaporates so that the surface of the seed is cooled.

The condensing medium may, for instance, consist of steam, but other media having a condensation temperature of 80-200° C. are also suitable.

A skilled person will understand that the parameters to be selected for step (a), such as time, pressure and temperature, depend on the size of the seeds, the type of seed and the properties of the condensing medium. For instance, a certain type of seed having larger dimensions may usually be exposed to a steam treatment longer, while preserving germination capacity, than a type of seed having smaller dimensions.

Step (a) is carried out for 0.1-60 seconds, preferably for 0.1-5 seconds, and still more preferably for 0.5-1.5 seconds. In step (a), the surface of the seeds will reach a temperature of 200° C. at most, before the seed parts are subjected to step (b). Preferably, in step (a), the surface of the seeds reaches a temperature of 80-150° C.

Step (a) is preferably carried out at a pressure of 0.5-20 bar absolute, still more preferably a pressure of 1-5 bar absolute.

Preferably, in step (b), the seeds are cooled by means of a vacuum treatment or another manner in which rapid evaporation occurs.

Step (b) is carried out such that, within 30 seconds, the temperature of the surface of the seeds is lowered to 50° C. at most. Preferably, step (b) is carried out such that, within 10 seconds, the temperature of the surface of the seeds is lowered to 30° C. at most.

Preferably, step (b) is carried out for 0.5-30 seconds, more preferably for 0.5-5 seconds, and still more preferably for 0.5-1 seconds. In step (a), preferably, steam is used as the condensing medium. The condensing medium may optionally be superheated.

The initial temperature of the seeds is preferably −30-30° C., more preferably 0-30° C. and still more preferably 10-25° C.

For the sake of completeness, it is noted that all above-mentioned limit ranges comprise both the limit values mentioned above and below.

It will be clear to a skilled person that the initial temperature of the seeds is understood to mean the temperature of the seeds just before or at the moment when they are subjected to the sterilization step. Preferably, the method according to the invention is carried out such that the temperature of the germinating part of the seeds does not greatly exceed the initial temperature of the seeds.

Preferably, the initial temperature of the germinating part of the seeds is essentially preserved. Although a small increase of the initial temperature will not directly have a great adverse influence on the germination capacity of the seeds, and sometimes even a positive influence, it will be clear that the germination capacity of the seeds will increasingly be harmed according as the temperature of the germinating part of the seeds more greatly exceeds the initial temperature during the treatment. The harm to the germination capacity depends on the maximum temperatures reached by the germinating parts of the seeds and the time during which these temperatures occur. This will differ per type of seed.

By means of the method according to the present invention, also, seeds can be treated which are suitable for consumption or industrial processing.

The seeds to be treated with the method according to the invention are those plant parts which can be used for reproduction and can be chosen from the group of seed kernels, bulbs, tubers, cuttings and rhizomes, but are not limited to this group. The invention further relates to seeds which can be obtained by means of the method according to the invention.

EXAMPLE 1

In experiments 1-10, barley seeds were treated with the method according to the invention. The duration and pressure in steps (a) and (b) were varied, and these are shown in Table 1. In experiments 1-5, the initial temperature of the cores of the seeds was 20° C., while in experiments 6-10 the initial temperature of the cores of the seeds was −20° C. In all experiments, the minimum supply temperature of the steam was 120° C., and from experiment 5, the steam was superheated to 160° C. It was then determined to what extent the treatment according to the invention had influenced the number of microorganisms on the seed, and what the effect on the germination of the seed was. As a control, also, the contents of microorganisms and the germination were determined of barley seeds which were not subjected to the treatment according to the invention, and whose initial temperature was 20° C. and −20° C., respectively.

TABLE 1

| exp. no. | step (a) time (s) | step (b) mbar |
|---|---|---|
| 1 | 0.5 | 100 |
| 2 | 2 | 100 |
| 3 | 0.5 | 20 |
| 4 | 1 | 20 |
| 5 | 2 | 100 |
| 6 | 2 | 100 |
| 7 | 0.5 | 100 |
| 8 | 5 | 100 |
| 9 | 10 | 100 |
| 10 | 60 | 100 |
|  |  | 100 |

Figure 2:
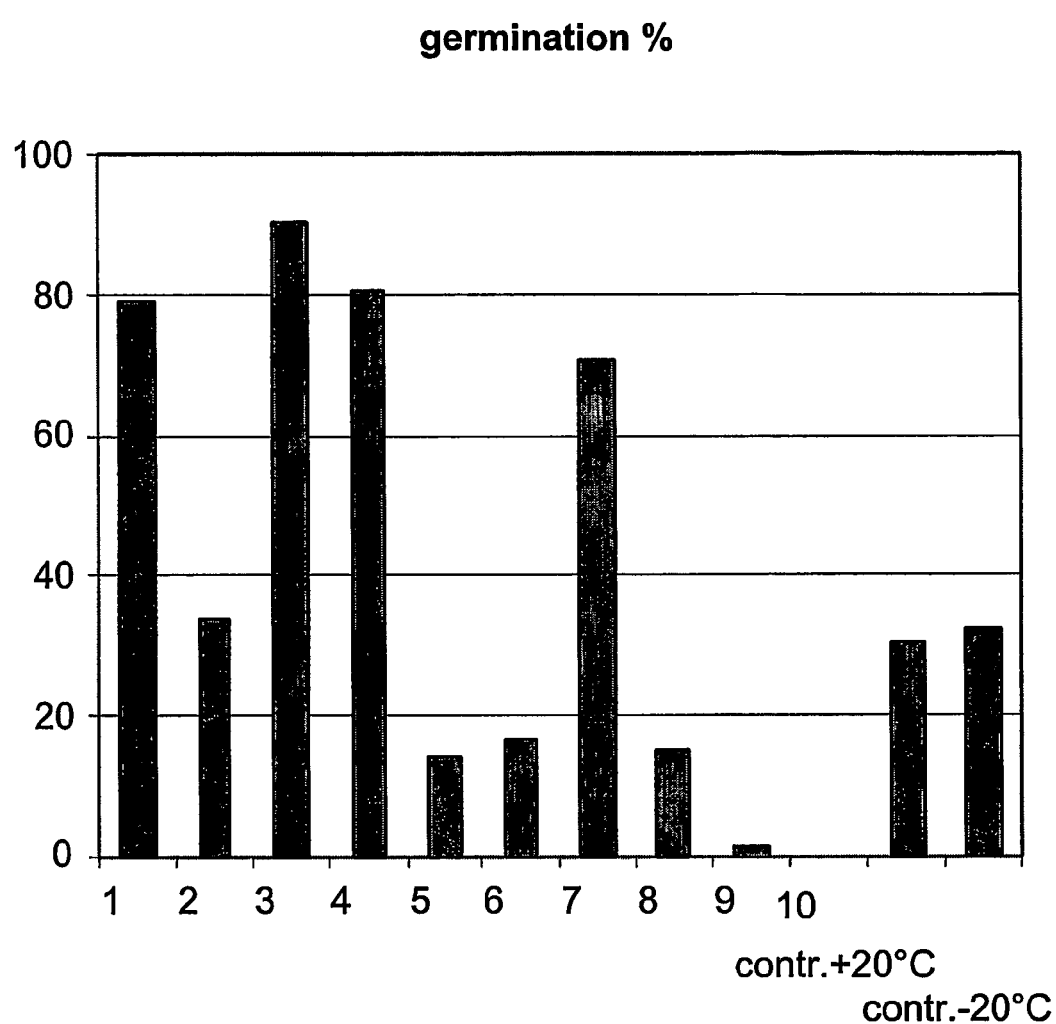

After each treatment, the seeds (3 g, approximately 60 seeds) were shaken for 3 hours with 10 ml of sterile demineralized water. Subsequently, 100 µl of a 1:1000 dilution of the water was spread on an LB plate and, for two days, incubation of the LB plates took place in an incubator at a temperature of 37° C. After this, the seeds obtained with the treatments were placed to germinate in Petri dishes between 2×2 layers of filter paper (with 3 and 2.5 ml of water, respectively). Incubation in the dark took place at 20° C. for one week. FIGS. 1 and 2 show the results of the number of colonies that could be counted on the Petri dishes and the maximum number of seeds that germinated after each treatment. FIG. 1 clearly shows that the number of microorganisms on the seeds decreased when the seeds were treated with the method according to the invention, while FIG. 2 clearly shows that the treatment according to the invention had a positive influence on the germination capacity of the seeds when the treatment took place for a relatively short time.

The invention claimed is:

1. A method for treating seeds having an initial temperature in the range of from −30 to 30° C. at the moment they are subjected to sterilization, comprising the following steps:
    (a) contacting the seeds with steam for 0.1 to 5 seconds and at a minimum pressure of 0.5 bar absolute, wherein the steam condenses on the seeds and the temperature of the surfaces of the seeds is raised to 200° C. at most; and
    (b) cooling the sterilized seeds obtained in step (a), wherein the temperature of the surface is lowered, within 10 seconds to 30° C. at most, and
    wherein the conditions of steps (a) and (b) are set such that the germination capacity of the seeds is relatively preserved or increases wherein, in step (a), the surface of the seeds reaches a temperature of 80-150° C., before the seeds are subjected to step (b).

2. A method according to claim 1, wherein step (a) is carried out for 0.5-1.5 seconds.

3. A method according to claim 1, wherein step (a) is carried out at a pressure of 0.5-20 bar absolute.

4. A method according to claim 1, wherein, in step (b), the seeds are cooled by means of a vacuum treatment or another manner in which rapid evaporation occurs.

5. A method according to claim 1, wherein step (b) is carried out for 0.5-5 seconds.

6. A method according to claim 1, wherein the seeds have an initial temperature of 0-30° C.

7. A method according to claim 1, wherein the seeds are selected from the group consisting of seed kernels, bulbs, tubers, cuttings, and rhizomes.

8. A method according to claim 1, wherein the seeds are seeds suitable for consumption or industrial processing.

9. Seeds produced by the method according to claim 1.

10. A method for treating seeds having an initial temperature in the range of from −30 to 30° C. at the moment they are subjected to sterilization, comprising the following steps:
    (a) contacting the seeds with steam for 0.1 to 1.5 seconds and at a pressure of 0.5-20 bar absolute, wherein the steam condenses on the seeds and the temperature of the surfaces of the seeds is raised to 200° C. at most; and
    (b) cooling the sterilized seeds obtained in step (a), wherein the temperature of the surface is lowered, within 10 seconds to 30° C. at most, and
    wherein the conditions of steps (a) and (b) are set such that the germination capacity of the seeds is relatively preserved or increases wherein, in step (a), the surface of the seeds reaches a temperature of 80-150° C., before the seeds are subjected to step (b).

* * * * *